United States Patent Office 3,698,946
Patented Oct. 17, 1972

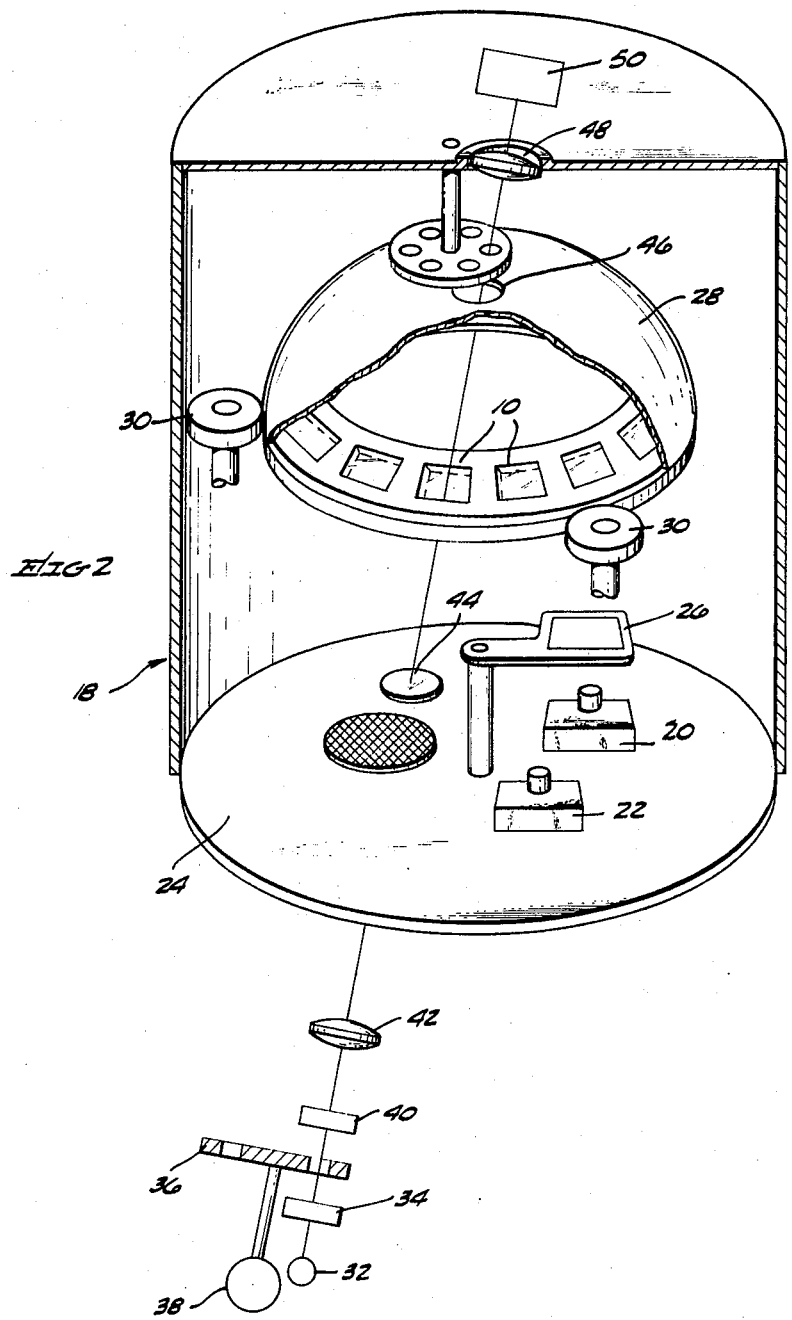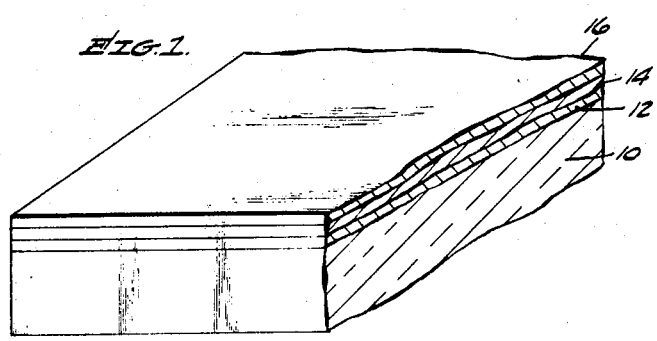

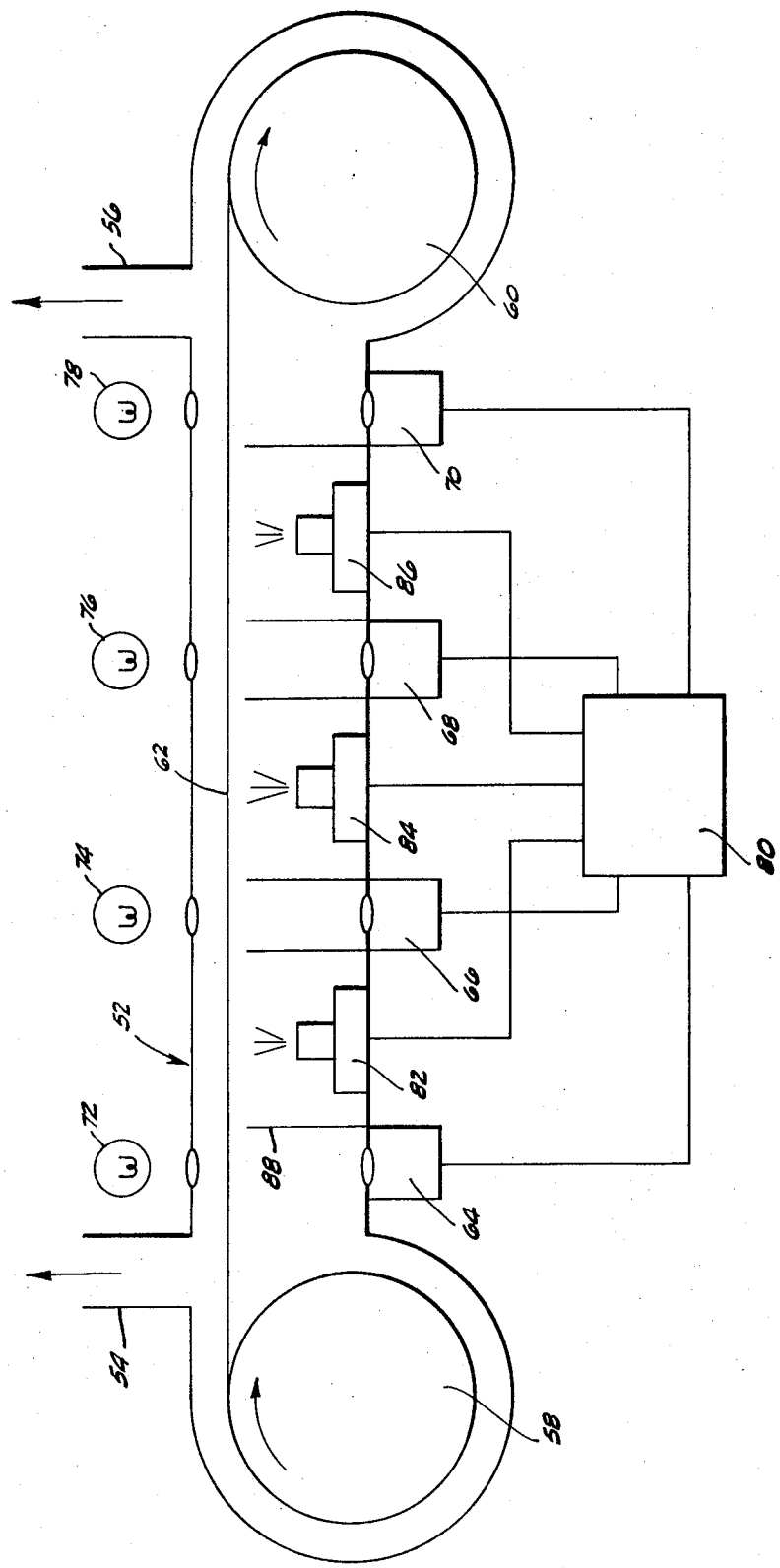

3,698,946
TRANSPARENT CONDUCTIVE COATING AND PROCESS THEREFOR
Alfred F. Kaspaul and Erika E. Kaspaul, Malibu, Calif., assignors to Hughes Aircraft Company, Culver City, Calif.
Filed Nov. 21, 1969, Ser. No. 878,698
Int. Cl. B44d 1/18, 1/14
U.S. Cl. 117—211
8 Claims

ABSTRACT OF THE DISCLOSURE

The transparent electrically-conductive coating is a composite layer comprising a first layer deposited as titanium monoxide, a second layer of noble metal and a third layer deposited as titanium monoxide, on a transparent substrate. Each of the layers is sufficiently thin to have a substantial transmissivity to optical radiation.

The process comprises successive in-vacuo depositions of the layers. The layers provide a conductive coating on glass or flexible polymer composition substrate which is highly transparent in the visible, ultraviolet and infrared spectrum.

BACKGROUND

This invention is directed to the in-vacuo coating of transparent electrically-conductive coatings onto both rigid and flexible substrates.

The best known prior art is described in "Vacuum Deposition of Thin Films," by A. L. Holland, John Wiley & Sons, Inc., pp. 491 through 509. The existing methods of deposition of transparent electrically-conductive coatings have serious shortcomings. Tin oxides may be produced only on glass and quartz, because of the high temperatures involved to form the conductive films. The tin oxides are generally created by spraying a solution containing a tin salt and some additives onto a hot substrate. The additives are for improvement of the electrical conductivity. Copper iodide coatings are made by in-vacuo deposition of copper onto the substrate, followed by a fairly long exposure to iodine vapor at elevated pressure. These films are quite transparent. However, the electrical conductivity decreases upon exposure of the structure to a vacuum environment.

Metal oxide/metal/metal oxide sandwiches are known to result in good transparent, conductive coatings on glass or flexible synthetic polymer materials. They have been made by sputtering of the reactive metal oxides, as well as the metal. A few are made by sputtering of the base metal oxide coating followed by in-vacuo deposition of the intermediate metal, and again sputtering on the top metal oxide layer. In both cases, the sputtering process limits the processing speed. Furthermore, sputtering is usually not compatible with other in-vacuo deposition processes which may be needed for further treatment or employment of a transparent conductive coating on a substrate. In-vacuo deposition of the prior art oxides is quite difficult and has not, as yet, shown any promise.

SUMMARY

In order to aid in the understanding of this invention, it can be stated in essentially summary form that it is directed to a transparent electrically-conductive coating and process therefor. The coating comprises successive thin, transparent layers of titanium oxide, a noble metal or an alloy of noble metals and titanium oxide on a transparent substrate. The process for producing the coating comprises successive in-vacuo deposition of titanium oxide, a noble metal, or a noble metal alloy and titanium oxide onto a substrate, each of the deposition steps being controlled, so that the deposited layer is sufficiently thin to be transparent.

Accordingly, it is an object of this invention to provide a transparent electrically-conductive coating upon a rigid or flexible substrate, said coating being highly transparent in the visible, ultraviolet and the infrared portions of the electromagnetic spectrum. It is a further object to provide a coated article, which comprises a substrate on which are located two layers of titanium oxide between which a layer of noble metal is positioned, the layers being sufficiently thin so that they are transparent. It is a further object to provide a process for producing a transparent electrically-conductive coating, which process comprises the steps of successively in-vacuo vapor-depositing layers of titanium oxide, noble metal and titanium oxide, each being sufficiently thin that the plurality of layers is sufficiently transparent. Other objects and advantages of this invention will become apparent from a study of the following portion of the specification, the claims and the attached drawings.

BRIEF DESCRIPTION OF THE DRAWINGS

FIG. 1 is a perspective view, with parts broken away, showing the transparent conductive coating (not drawn to scale) of this invention on a substrate.

FIG. 2 is a schematic perspective view of apparatus, with parts broken away, which can be employed to perform the process and create the article.

FIG. 3 is a schematic side elevational view of a device for the continuous performance of the process and creation of the article.

DESCRIPTION

Figure 4:
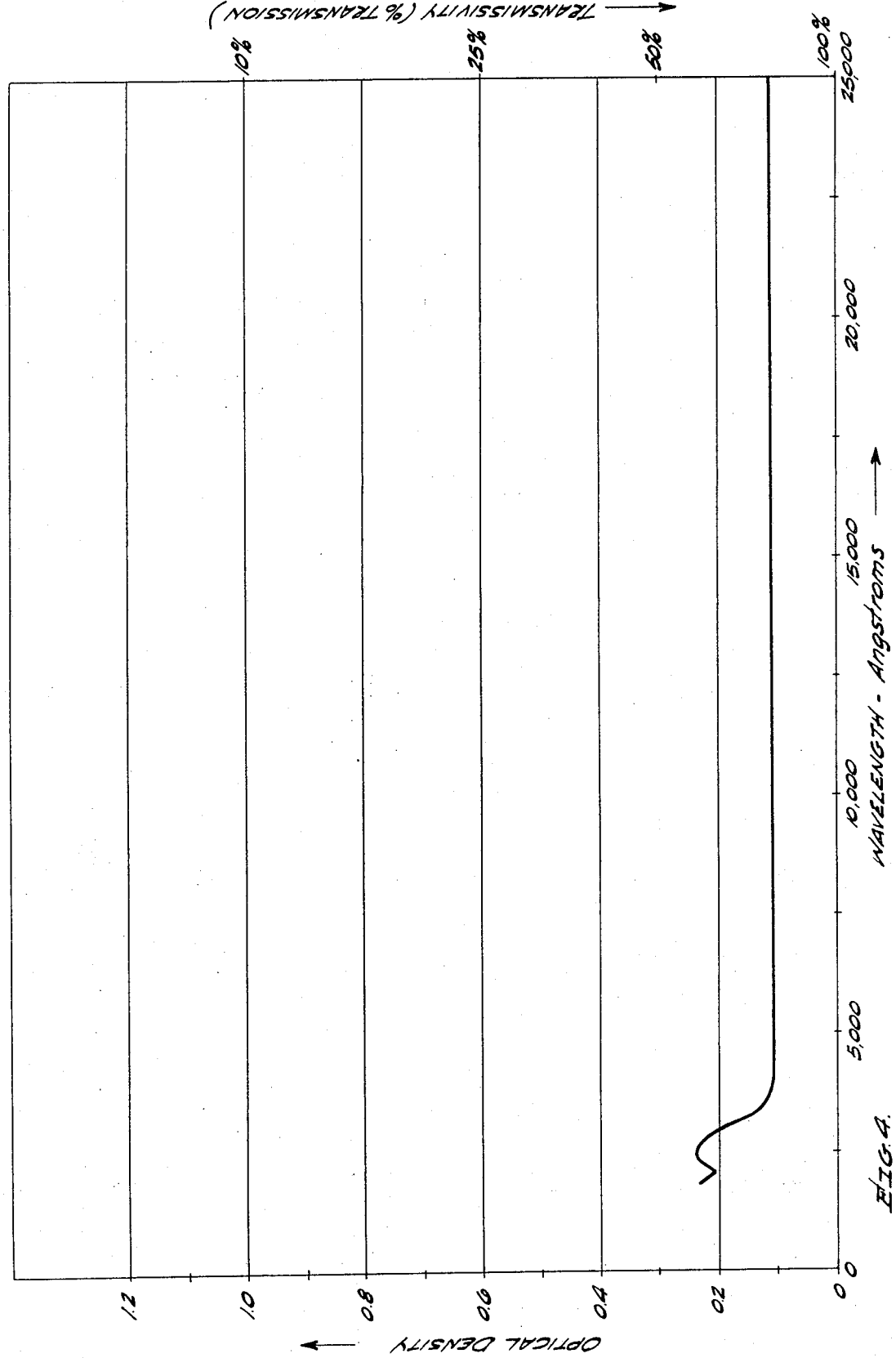
FIGS. 4 and 5 are graphs of the spectral absorption characteristics of typical samples produced by this process.

Referring to FIG. 1, substrate 10 is illustrated as carrying a transparent electrically-conductive coating having layers 12, 14 and 16 thereon. Substrate 10 can be any convenient substrate, such as glass, quartz, ceramic, silicon, germanium, gallium arsenide, lead sulfide, indium antimonide, cadmium sulfide, cadmium selenide, zinc sulfide, and/or other semiconductor materials used in solid-state photodetectors, light-emitting devices, image converters, image amplifiers and similar electro-optical devices, or can conveniently be any one of a number of flexible synthetic polymer materials. This latter class includes polyester films, such as polyethylene-terephthalate (Du Pont "Mylar" and "Cronar," Eastman "Estar," etc.) and polymers of cellulose acetate, butyrate and/or propionate of various manufacture, polyimide films (such as Du Pont "Kapton"), polycarbonate films and many others.

Layer 12 is a titanium oxide layer. It is evaporated as titanium monoxide, but its state of oxidation after vacuum vapor deposition and exposure to air is unknown, so it is merely called titanium oxide without reference to a particular oxidation state. Layer 14 is a layer of noble metal deposited by in-vacuo vapor deposition. The metal is variously copper, silver, gold, palladium, tin or mixtures thereof. Layer 16 is identical to layer 12. Each of the layers is deposited with sufficient thinness as to provide a satisfactory total optical transmissivity.

The coating is accomplished in a vacuum chamber 18, which is shown as being broken away in the front and top, for convenience in viewing the internal structure.

Vapor sources for the creation of appropriate flux within the vacuum chamber are shown at 20 and 22. These comprise evaporation sources which can be controlled exteriorly of the vacuum chamber, by the appropriate application of power thereto to cause the creation of the desired flux. Any conventional evaporation source, such as coated or uncoated tungsten boats, are suitable. Shutter 26 is movable to cover either or both of the vapor outlets directed upwardly into chamber 18. Thus, the deposition process can be stopped by moving the shutter into place. Moving the shutter away provides an upwardly-directed vapor flux for coating purposes.

Fixture 28 is mounted on rollers 30 so that it is rotatably mounted in the upper end of the vacuum chamber. Fixture 28 carries, on its lower side, a plurality of the substrates 10 upon which the conductive coating is to be applied.

An optical path is provided through the vacuum chamber to measure the transmissivity of the test substrates as they are being coated. Light source 32 radiates through condensing lenses 34 and through chopper 36. Chopper 36 is in the form of a disc having a plurality of holes therethrough, the disc being driven by motor 38. The chopped light passes through filter 40, which is preferably a monochromatic interference filter. The resultant monochromatic light passes through focusing lens 42, through a window 44 in the bottom of the vacuum chamber, through opening 46 in the top of fixture 28, through test glass holds 47 and, finally, through window 48 in the top of the vacuum chamber, to detector 50. The detector thus indicates the transmissivity of the one test glass being coated simultaneously with each layer on the substrates 10. Coating control of the successive layers is thus managed by switching a new test glass into the path for each coating layer. Continuous monitoring of the coating process results. The test glasses are stationary with respect to the vapor sources; the samples are rotating in the ring fixture, which is much closer to the source in such a manner that the resulting flux density is about equal for both.

In accomplishing the process, substrates 10 are first cleaned with methanol and lint-free sterile cotton and placed within the dome of fixture 28. Vacuum chamber 18 is closed and then the pressure is reduced to about $10^{-6}$ torr, but a range of from $10^{-5}$ to $10^{-7}$ torr is satisfactory. Fixture 28 is rotated, in order to obtain uniform exposure of the several substrates in the vapor flux. After the boiler 20 is heated, the shutter is moved away from the inlet end of vapor tube to produce a titanium monoxide flux in the vacuum chamber. The flux is directed at the substrates 10, and at the test glass of which the transmissivity is being measured by detector 50. When the transmissivity indicates the proper level of deposition (approximately 75 to 95 percent transmission), the incoming titanium monoxide flux is cut off, both by moving shutter 26 over the inlet end of the tube, and by stopping heating of the boiler 20. Thereupon, the boiler 22 is heated to produce noble metal vapor and the shutter is moved away from the open end of tube on boiler 22, while the flux is directed toward the substrates 10 mounted in fixture 28. During noble metal deposition, the transmissivity is again monitored with a second test slide moved into position. When the transmissivity indicates the proper amount of noble metal deposition (approximately 70 to 90 percent transmission), the shutter is again moved and the boiler power turned off.

The second titanium oxide deposition is a repeat of the first step, but with a new test glass. Thus, the uppermost layer, on top of the noble metal, is deposited. Again, shutter 26 is appropriately positioned. The vacuum chamber is backfilled to atmosphere and the coated substrates are removed for use.

A continuous process could also be employed, with a substrate film first passing a source of titanium monoxide vapor, then noble metal vapor and, finally, titanium monoxide vapor again to deposit the top layer thereon.

FIG. 3 illustrates a device by which the continuous process can be accomplished, and upon which the article can be continuously created. FIG. 3 illustrates a vacuum chamber 52 which has connections to a vacuum pump at 54 and 56. A supply of the substrate to be coated is mounted at 58 and the finished article is wound up at the other end of the vacuum chamber at 60. The substrate being processed between the supply and the finished article windup is generally indicated at 62.

Detectors 64, 66, 68 and 70 are mounted along one side of the vacuum chamber, and lamps, 72, 74, 76 and 78 are respectively positioned on the opposite side of the vacuum chamber therefrom. Appropriate lenses in the vacuum chamber walls permit the light from lamp 72 to pass through substrate 62 and to detector 64, and the same for the other lamp and detector pairs. The detectors are each connected to control unit 80, which comprises circuits which indicate the differential density between adjacent detector pairs.

Positioned between detectors are vapor sources 82, 84 and 86. The vapor sources 82, 84 and 86 are also each connected to control unit 80, so that the vapor flux generated by these vapor sources is controlled by the control unit. Vapor sources 82 and 84 are titanium monoxide vapor sources, while the vapor source 84 is the noble metal or noble metal alloy vapor source. The vapor flux rate of each one of the vapor sources is dependent upon the amount of energization the vapor source receives from the control unit 80. In order to maintain the separation of the vapor flux, to prevent the vapor flux from impinging upon the lamp or detector lenses, and to maintain a flux-free zone through which the lamp illumination shines through the substrate, vapor baffles 88 are provided. One of these is provided on each side of each of the vapor sources.

In continuous operation, the substrate 62 is advanced from its source 58 to its windup 60 at a substantially constant rate. The lamps 72 through 78 are illuminated, and the control unit receives input from detectors 64 through 70, and establishes the differential transmissivity of the substrate across each one of the vapor sources. The vapor sources are energized, the energization of vapor source 82 being such that the differential transmissivity between detectors 64 and 66 is at a predetermined value. Similarly, the vapor source 84 is energized to such an extent that the differential density between detectors 66 and 68 is at a predetermined value. Finally, vapor source 86 is energized at such a rate that the differential density between detectors 68 and 70 is at a predetermined value. Accordingly, each of the vapor sources applies the desired thickness of layer so that the resultant combination of layers is of the proper transmissivity. With a continuous process, as illustrated in FIG. 3, the article can be produced at a faster rate. These values in such a continuous process are similar to those in the batch-type examples given below.

One of the important uses of the conductive coating is on those substrates which can carry electron-sensitized or exposed sensitive materials. In this case, the substrate of the invention is useful for the conducting away of the electron current. Another useful application of the invention is the providing of a transparent, electrically conductive overcoating on solid-state photodetectors and light-emitting panels. In the past, the provision of such overcoating has been a major problem with respect to many solid-state imaging devices.

Figure 5:
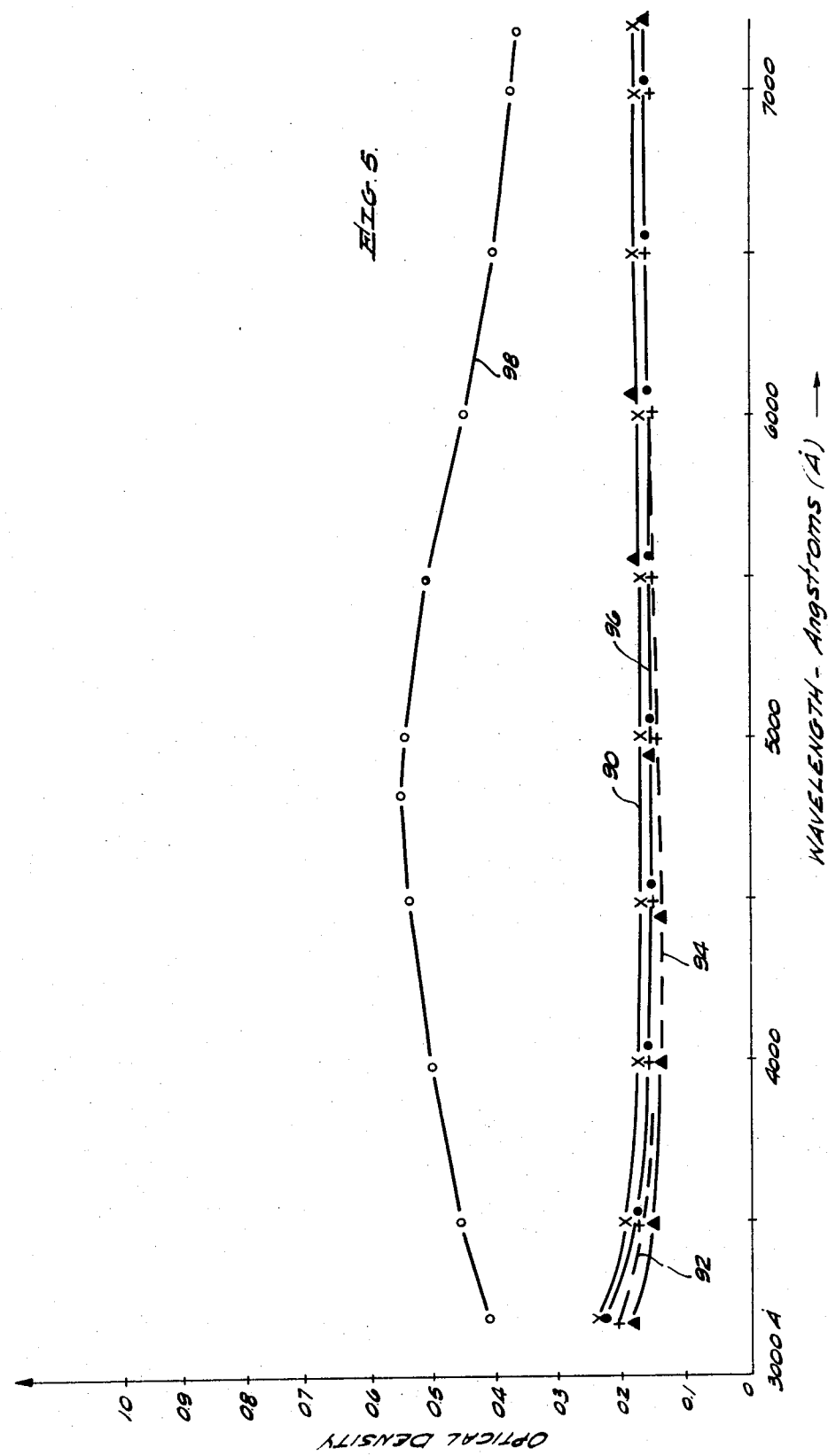

FIGS. 4 and 5 illustrate the spectral absorption characteristics of various of these coatings. The curve of FIG. 4 illustrates the absorption characteristics of Examples I through IV. In FIG. 5, curve 90 also illustrates those examples. Curve 92 illustrates the spectral absorption characteristics of the articles of Examples V, VI, XI and XII. Curve 94 illustrates those characteristics of Examples VII and VIII. Curve 96 illustrates those characteristics of the articles of Examples IX and X. Finally, curve 98 illustrates those characteristics of the articles of Examples XIII and XIV.

Specific examples of the manner in which the batch-type process is carried out are given below.

EXAMPLE I

Cleaned substrates of glass, quartz and DuPont "Cronar" polyester film were placed in a vacuum chamber, which was held at a vacuum of $6 \times 10^{-7}$ torr. Thereupon, they were exposed to a vapor flux successively of titanium monoxide, then a 50-50 mixture of palladium and gold, and finally to titanium monoxide, so that the transmissivity of these individual layers were respectively 91 percent, 79 percent and 91 percent for monochromatic light having a wavelength of 5280 angstroms, by the empolyment of a "Balzers 528-12 B-40" interference filter. The deposition was carried out in a standard BA-510 vacuum coater, manufactured by Balzers A. G. of Liechtenstein, Europe. Upon removal of the substrates from the vacuum coater, their resistance was measured and found to be 1,600 to 2,000 ohms per square and their overall transmissivity was found to be 72 to 74 percent; the specific values are listed in the first three rows of the following table. The spectral absorption (optical density) characteristics of the coated quartz sample was measured versus a blank quartz substrate, and the results are plotted in FIG. 4. Note that the optical density remains below 0.25 (transmissivity greater than 56 percent) across the entire spectum from 1900 A. to 25,000 A.

The examples given below in tabular form were performed in substantially the same manner.

| Example No. | Film composition | Substrate material | Overall transmissivity (percent transmission) | Resistivity (ohms/square) K |
|---|---|---|---|---|
| II | $TiO_x/Au-Pd/TiO_x$ | Cronar | 74 | 1.6 |
| III | $TiO_x/Au-Pd/TiO_x$ | Glass | 72 | 1.6 |
| IV | $TiO_x/Au-Pd/TiO_x$ | Quartz | 72 | 1.8-2 |
| V | $TiO_x/Cu/TiO_x$ | Cronar | 71 | 1.0 |
| VI | $TiO_x/Cu/TiO_x$ | Glass | 71 | 2.5 |
| VII | $TiO_x/Ag/TiO_x$ | Cronar | 72 | 200 |
| VIII | $TiO_x/Ag/TiO_x$ | Glass | 72 | 10 |
| IX | $TiO_x/Au/TiO_x$ | Cronar | 74 | 8-6 |
| X | $TiO_x/Au/TiO_x$ | Glass | 76 | 3-4 |
| XI | $TiO_x/Pd/TiO_x$ | Cronar | 72 | 5 |
| XII | $TiO_x/Pd/TiO_x$ | Glass | 72 | 3.5 |
| XIII | $TiO_x/Sn/TiO_x$ | Cronar | 39 | 1,500 |
| XIV | $TiO_x/Sn/TiO_x$ | Glass | 38 | 8 |

This invention having been described in its preferred embodiment, it is clear that it is susceptible to numerous modifications and embodiments within the ability of those skilled in the art and without the exercise of the inventive faculty.

What is claimed is:

1. The process of producing a transparent electrically-conductive coating comprising the steps of:
   vapor depositing a layer of titanium monoxide in-vacuo onto a substrate and cutting off deposition while the vacuum-deposited layer still has optical transmissivity;
   vapor depositing in-vacuo a layer of metal onto said layer of titanium monoxide and cutting off deposition while said metal layer still has optical transmissivity;
   vapor depositing a layer of titanium monoxide in-vacuo onto said layer of metal and cutting of deposition while said layer still has optical transmissivity so that the coated layers have a resistivity not over about 10k ohms per square and have an optical transmissivity at least 50 percent to visible light.

2. The process of claim 1 further including the continued surveillance of optical transmissivity as vacuum deposition proceeds in each of the vacuum deposition steps, including cutting off the vacuum deposition of each step, in accordance with observed optical transmissivity.

3. The process of claim 1 wherein each of said steps is continuously and successively accomplished on a continuously advancing substrate.

4. A transparent electrically-conductive coating on a substrate comprising:
   a substrate;
   a first transparent layer deposited as titanium monoxide on said substrate;
   a second transparent layer of metal selected from the group consisting of copper, silver, gold, palladium, tin and gold-palladium alloy on said first layer;
   a third transparent layer deposited as titanium monoxide on said second layer, said layers having a resistivity of not over about 10k ohms per square and being sufficiently thin so that said layers have a total optical transmissivity to visible light of at least 40 percent.

5. The article of claim 4 wherein said metal layer is of a metal selected from the group consisting of silver, gold, palladium and gold-palladium alloy.

6. The article of claim 4 wherein said substrate is selected from the group consisting of:
   glass, quartz, ceramic, silicon, germanium, gallium arsenside, lead sulfide, indium antimonide, cadmium sulfide, cadmium selenide, zinc, sulfide, gallium phosphide, gallium arsenide-phosphide, zinc oxide, zinc selenide, selenium, selenium oxide, lead telluride, mercury-cadmium telluride, indium arsenide and silicon carbide.

7. The article of claim 4 wherein said substrate is a transparent, flexible synthetic polymer material.

8. The article of claim 6 wherein said first layer has an optical transmissivity of at least 75 percent, said second layer has optical transmissivity of at least 70 percent and said third layer has an optical transmissivity of at least 75 percent to result in total optical transmissivity for visible light of at least 40 percent.

References Cited

UNITED STATES PATENTS

| | | | |
|---|---|---|---|
| 2,999,034 | 9/1961 | Heidenhain | 117—106 X |
| 2,907,672 | 10/1959 | Irland et al. | 117—107 X |
| 3,053,698 | 9/1962 | Ogle, Jr., et al. | 117—217 X |
| 2,936,732 | 5/1960 | Ring et al. | 117—106 X |

OTHER REFERENCES

C. A. Willis, J. M. Winter, and M. Lauriente. Titanium Oxide Films. In Chemical Abstracts. 59:10790f. 1963.

RALPH S. KENDALL, Primary Examiner

C. K. WEIFFENBACH, Assistant Examiner

U.S. Cl. X.R.

117—106, 107, 107.1, 217, 221, 71